3,268,444
METHOD OF DISINFECTING POTABLE WATERS
Charles E. Renn, Baltimore, Md., assignor to Commercial Filters Corporation, Melrose, Mass.
No Drawing. Filed June 5, 1963, Ser. No. 285,609
5 Claims. (Cl. 210—64)

This application is a continuation-in-part of application Serial No. 617,890, filed October 23, 1956, now abandoned.

This invention relates to methods of disinfecting potable waters and particularly to a method for improving the efficiency of contact during disinfection of potable waters. It has long been recognized that low concentrations of silver ions or silver-bearing materials that yield silver ions will combine with sulfhydryl groups in bacteria and other micro-organisms to form stable silver-sulfur compounds within the cell. These silver-sulfur complexes are incapable of transferring hydrogen, and oxidative reaction and hydrogen transfer are blocked within the cell with the result that the cells eventually die. The practical application of this knowledge to drinking waters has been seriously limited by the danger that excessive concentrations may be harmful to humans and to domestic animals and by the physical difficulty of maintaining a satisfactory concentration of active silver in the water.

The latter problem is accentuated by the fact that silver reacts rapidly with a variety of materials commonly in or in contact with potable waters. For example, it is readily adsorbed upon the surfaces of containers, pipes, valves, tanks and the like.

I have discovered that the difficulties which have heretofore prevented the application of silver ions to potable waters may be overcome by bringing the bacteria population of polluted waters into contact with relatively immobile films of silver ions upon silvered solid interfaces. I provide a film of sponge silver laid down upon a fine, pervious filter-like material whose structure is controlled to insure the contact of water-borne bacteria with an envelope of soluble silver held or adsorbed on the silver interface. The high silver layer acts as a specific sulfhydryl zeolite and the rate of reaction between ionized silver and labile sulfhydryl groups of the bacterial series will be accelerated by the high concentration of silver available at the silver sponge interface.

The use of filters to mechanically remove bacteria is old. For example, Conconi Patent No. 2,283,883 describes such a filter. Such filters are plagued with the problem of contamination as well as with the exceedingly slow rates of filtration characteristics of a filter having pores sufficiently small to filter bacteria.

The operation of my invention may perhaps be better understood by reference to the following examples:

A film of sponge silver is formed upon finely divided diatomite by reducing organic silver complexes of high molecular weight such as the Werner complexes. The resulting sponge silver-diatomite particles are filtered through a micro-filter cartridge such as the Cuno micro-filter cartridge so that the cartridge becomes impregnated with the particles. This provides a fixed cartridge of fine pore size as distinguished from the loose mobile filter beds commonly used. The resulting pores should be less than 80 microns in diameter but sufficiently large to permit free passage of bacteria therethrough and preferably in the range between about 5 microns to 10 microns in diameter. Pores of diameter larger than 80 microns are not effective, apparently because the Brownian movement in the water limits the distance through which effective exchange can take place. I believe that Brownian movement acts to move the bacteria within the pores so that while passing through the pore every spore and fine particle is brought into contact with the silver sponge-diatomite pore wall. Polluted water passed through this micro-filter cartridge will cause silver from the field to exchange to the bacterial cells that enter the adsorbed film at the silver sponge interface while sulfhydryl groups move from the bacterial cells into the high silver films where they are bound as silver salts. Inert solid fines of other materials may be substituted for the diatomite; for example, active carbon fines, pulverized pumice, micronized silica and the like may be used for coating with silver. These silver-sponge coated fine particles are then dispersed onto a fixed matrix of relatively coarse pore size such as the Cuno micro-filter cartridge already mentioned, filter plates, bowls or other matrix. It should be noted, however, that a fixed bed is essential as distinguished from loose mobile beds commonly associated with oligodynamic techniques and that the pore size be strictly controlled within the range above set forth.

*Example I*

Commercial filter cartridges of melamine coated paper fibre, felted to provide void volumes varying from 5 microns at the center to 80 microns at the outer surface, were infiltrated with a very thin slurry of silver sponge coated diatomite. All coated particles larger than 5 microns are presumed to be retained. The total void space in these cartridges is normally 80% of the total volume; after infiltration roughly 20% of this void space is filled with silvered diatomite.

These cartridges, used as a contact disinfecting system, have a high bactericidal efficiency. Infiltrated cartridges fed at a rate affording an average polluted water contact time in the bed of 15 seconds killed 80% of the coliform bacteria present. Control units made up by infiltrating cartridges with silver free diatomite and fed at the same rate reduced the bacterial count only approximately 10% by mechanical filtration. Coliform bacteria escaping kill in the bactericidal cartridge die in the filtrate at a slightly slower rate.

*Example II*

A wet cake filter prepared by mixing equal volumes of silver sponge coated diatomite with activated carbon dust deposited upon a woven nylon filter leaf also showed high bactericidal efficiency. The pore size again was in the range 5 microns to 80 microns. A sponge silver diatomite-carbon bed approximately 1000 $cm.^2$ in area and .2 cm. deep was irrigated with dilute bacterial suspensions at rates affording from 12 to 24 seconds void volume exchange. The concentrations of bacetria in the influent contained about 100,000 coliform bacteria per 100 ml. Effluents from all experiments were free of coliform bacteria—the filter beds were tested immediately after use and found to be free of coliform bacteria. Methods for discriminating between bacteristatic and bactericidal effects were used throughout, to insure that the high efficiencies were due to true bactericidal activity of the silver.

*Example III*

A 17 liter city water sample was seeded by the addition of 1 liter of sewage effluent to produce a water containing coliform and fecal streptococci. Three separate portions of this water were passed through one inch of activated charcoal, one inch of sand and one inch of activated charcoal treated with silver by precipitating sponge silver thereon as described in Example I. Each of these beds was held within a polyethylene cartridge ⅝" in diameter, was made of identical size material and fixed by gauze at each end to form a fixed immobile bed. The pore size was about 5 microns to 50 microns determined by flow rate methods. The effect of the several treating beds on the bacteria in the water are tabulated in Table 1 from 100 cc. of water collected from each of the treating beds after 3 liters had passed through the beds. All counts were made after 48 hours of incubation.

TABLE 1

|  | Charcoal | Sand | Bed of Invention |
|---|---|---|---|
| Coliform | 4,600 | 17,000 | 2.2 |
| Fecal streptococci | 4,900 | 7,000 | 92.0 |
| Total count | 80,000 | 70,000 | 80.0 |

The foregoing results show that the bacteria did pass freely through the beds but, in the case of the bed treated by this invention, the bacteria were effectively destroyed during passage.

While I have described certain preferred embodiments of my invention it will be understood that it may be otherwise embodied within the scope of the following claims.

I claim:
1. A method of disinfecting potable waters consisting essentially of the steps of forming a film of sponge silver upon a finely divided inert carrier material, collecting and fixing said sponge silver film inert carrier material on and within a coarse, porous framework to form a fixed bed finer porous member having pores whose diameter is sufficient to permit the passage of bacteria but less than about 80 microns and passing water containing bacteria to be disinfected through the porous member to cause an exchange reaction between the silver sponge and the sulfhydryl groups of bacterial cells in the water.

2. A method of disinfecting potable waters consisting essentially of the steps of forming a film of sponge silver upon a finely divided diatomite, collecting and fixing said sponge silver film diatomite upon and within a coarse matrix to form a fixed finer bed porous member having pores whose diameter is sufficient to permit the passage of bacteria but less than about 80 microns and passing water containing bacteria to be disinfected through the porous member to cause an exchange reaction between the silver sponge and the sulfhydryl groups of bacterial cells in the water.

3. A method of disinfecting potable waters consisting essentially of the steps of forming a film of sponge silver upon a finely divided inert carrier material, collecting and fixing said sponge silver film inert carrier material on and within a coarse, porous framework to form a fixed finer bed porous member having pores whose diameter is between about 5 microns and 10 microns and sufficient to pass bacteria therethrough and passing water containing bacteria to be disinfected through the porous member to cause an exchange reaction between the silver sponge and the sulfhydryl groups of bacterial cells in the water.

4. A method of disinfecting potable waters consisting essentially of the steps of forming a film of sponge silver upon a finely divided diatomite, collecting and fixing said sponge silver film diatomite upon and within a coarse matrix to form a fixed finer bed porous member having pores whose diameter is between about 5 microns and 10 microns and sufficient to pass bacteria therethrough and passing water containing bacteria to be disinfected through the porous member to cause an exchange reaction between the silver sponge and the sulfhydryl groups of bacterial cells in the water.

5. A method of disinfecting potable waters consisting essentially of the steps of forming a film of sponge silver upon a finely divided diatomite by reducing an organic silver complex compound in the presence of the diatomite, collecting and fixing the silver sponge film treated diatomite upon and within a coarse matrix to form a finer porous member having pores whose diameter is less than about 80 microns and passing a water containing bacteria to be disinfected through the porous member to cause an exchange reaction between the silver sponge and sulfhydryl groups of bacterial cells in the water.

References Cited by the Examiner
UNITED STATES PATENTS

| 1,988,246 | 1/1935 | Krause | 210—64 |
| 2,283,883 | 4/1942 | Conconi | 210—501 |
| 2,459,896 | 1/1949 | Schwarz | 117—138.5 |
| 2,508,602 | 4/1950 | Goetz | 210—64 X |

MORRIS O. WOLK, *Primary Examiner.*

E. G. WHITBY, *Assistant Examiner.*